(12) United States Patent
Flaherty et al.

(10) Patent No.: US 8,990,903 B2
(45) Date of Patent: Mar. 24, 2015

(54) EXTENSION POINT APPLICATION AND CONFIGURATION OF A LOGIN MODULE

(75) Inventors: Matthew W. Flaherty, Mendon, MA (US); Jay S. Rosenthal, Amherst, NH (US)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 11/938,136

(22) Filed: Nov. 9, 2007

(65) Prior Publication Data

US 2009/0125989 A1    May 14, 2009

(51) Int. Cl.
*H04L 29/06*    (2006.01)
*G06F 21/54*    (2013.01)

(52) U.S. Cl.
CPC ...................................... *G06F 21/54* (2013.01)
USPC ............................................... 726/5; 713/168

(58) Field of Classification Search
None
See application file for complete search history.

(56) References Cited

U.S. PATENT DOCUMENTS

| | | | |
|---|---|---|---|
| 6,609,198 B1 | 8/2003 | Wood et al. | |
| 6,944,761 B2 | 9/2005 | Wood et al. | |
| 7,133,904 B1 * | 11/2006 | Sohya et al. | 709/218 |
| 7,565,414 B1 * | 7/2009 | Love | 709/219 |

OTHER PUBLICATIONS

Katz, Mason J., et al; Leveraging Standard Core Technologies to Programmatically Build Linux Cluster Appliances, IEEE Int'l Conference on Cluster Computing (Cluster '02).
Pfitzmann, Birgit, et al; Analysis of Liberty Single-Sign-On with Enabled Clients, IEEE Internet Computing, Nov.-Dec. 2003.
Han, Richard, et al; WebSplitter: A Unified XML Framework for Multi-Device Collaborative Web Browsing, ACM, CSCW'00, Dec. 2-6, 2000.
Yu, Ting, et al; A compressed Accessibility Map for XML, ACM Transactions on Database Systems, vol. 29, No. 2, Jun. 2004, pp. 363-402.

* cited by examiner

*Primary Examiner* — Izunna Okeke
*Assistant Examiner* — Abdulhakim Nobahar
(74) *Attorney, Agent, or Firm* — Steven M. Greenberg, Esq.; CRGO Law

(57) ABSTRACT

Embodiments of the present invention address deficiencies of the art in respect to applying application security to an extension point oriented application framework, and provide a novel and non-obvious method, system and computer program product for log-in module deployment and configuration in an extension point oriented application. In this regard, a method for log-in module deployment and configuration in an extension point oriented application can include installing a proxy to a login controller plug-in for the extension point oriented application, and proxying login module directives from an external security service to the login controller plug-in for the extension point oriented application.

8 Claims, 2 Drawing Sheets

EXTENSION POINT APPLICATION AND CONFIGURATION OF A LOGIN MODULE

BACKGROUND OF THE INVENTION

1. Field of the Invention

The present invention relates to the field of application security and more particularly to login authentication and authorization service integration.

2. Description of the Related Art

Application security refers to both authentication and authorization. Generally application security intends upon identifying a user or computer attempting to execute functions within secure code and ensuring that the identified user or computer enjoys a right to execute the functions as requested. In this context, authentication is the process of determining whether or not an entity is who or what it declares itself to be, whereas authorization is the process of giving an entity permission to do, use, or obtain something once the entity has been authenticated. Thus, logically authentication precedes authorization.

In the context of portable code configured to execute within a virtual machine environment irrespective of a particular underlying computing platform, application security can be of paramount importance—particularly in that the code is portable and can be found in any arbitrary platform at any time. To with, at the time of development, it is seldom the case that the developer will know where and when portable code is to be executed.

In view of the security requirements of portable code, security logic has been embedded in the virtual machine itself to provide an interface for authenticating and authorizing access to portable code. By way of example, the Java Authentication and Authorization Service (JAAS) provides a set of application program interfaces that can determine the identity of a user or computer attempting to run functions in Java code and to ensure that the user or computer enjoys the right to execute the functions as requested. The JAAS authorization process extends the security policy of the Java virtual machine to specify or identify the privileges that have been granted to an entity attempting to execute code.

Despite the advances embodied in JAAS, JAAS is not flexible enough to integrate with a loosely coupled component based application having an extension point orientation. In this regard, a loose coupling can be achieved in an application framework partially through the mechanism of extensions and extension points. Specifically, when a logic in an application intends upon permitting plug-ins to extend or customize portions of its functionality, the logic can declare an extension point. The extension point declares a required contract, typically a combination of extensible markup language (XML) markup and Java interfaces, to which an extension must conform. Plug-ins seeking to connect to the extension point must implement the contract in their extension. Yet, the logic being extended need know nothing about the plug-in beyond the scope of the extension point contract. The Eclipse platform represents one such extension point oriented loosely coupled framework for application development.

In the Eclipse platform, like other loosely coupled extension point oriented frameworks, plug-ins for extension points provide a fundamental mechanism for extending the functionality of the application. Providing application authentication and authorization through a plug-in however, inhibits the application of a login configuration class provided, for example, by JAAS in as much as the JAAS configuration class cannot be provisioned from within a plug-in. Yet further, JAAS cannot view plug-in classloaders in the Eclipse environment.

BRIEF SUMMARY OF THE INVENTION

Embodiments of the present invention address deficiencies of the art in respect to applying application security to an extension point oriented application framework, and provide a novel and non-obvious method, system and computer program product for log-in module deployment and configuration in an extension point oriented application. In this regard, a method for log-in module deployment and configuration in an extension point oriented application can include installing a proxy to a login controller plug-in for the extension point oriented application, and proxying login module directives from an external security service to the login controller plug-in for the extension point oriented application.

In one aspect of the embodiment, installing a proxy to a login controller plug-in for the extension point oriented application can include installing the proxy in an archive to a boot classpath for the login controller plug-in. In another aspect of the embodiment, proxying login module directives from an external security service to the login controller plug-in for the extension point oriented application can include setting an internal login module factory as a provider of login modules to the extension point oriented application, identifying an external login module proxy class in a configuration for the login module, calling the external login module proxy class from the internal login module factory with an option specifying a particular login module by way of an extender associated with the option, and instantiating the particular login module.

In yet another aspect of the embodiment, the method also can include proxying a federator class in the login controller plug-in, and federating in the federator class multiple different configurations for the particular login module. Finally, in even yet another aspect of the embodiment, the method can include authenticating signed portions of the configurations before federating the configurations for the particular login module.

In another embodiment of the invention, an extension point oriented application data processing system can include a login controller plug-in for an extension point oriented application, and a proxy to the login controller plug-in proxying login module directives from an external security service to the login controller plug-in for the extension point oriented application. In an aspect of the embodiment, the login controller plug-in can include an external login module factory configured for coupling to an external login module proxy in the proxy. In another aspect of the embodiment, the login controller plug-in can include a configuration federator federating different login module configurations. Finally, the login module configurations can be specified in a markup language document with at least a portion of the configurations being signed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for log-in module deployment and configuration in an extension point oriented application. In accordance with an embodiment of the present invention, a proxy can be established between a log in controller plug-in to an extension point oriented application and a selected log in module that is external to the extension point oriented application. Thereafter, authentication and authorization logic provided by the selected log in module can manage authentication and authorization for the extension point oriented application through the proxy.

Notably, the selected log in module can be configured externally to the extension point oriented application. In this regard, one or more configuration providers can be proxied into the extension point oriented application and, in the instance of multiple configuration providers, the configurations produced by the multiple configuration providers can be aggregated through a configuration federator coupled to the extension point oriented application via the proxy. Finally, a configuration provided to the configuration provider can be structured in markup so as to permit the signing of different portions or the entirety of the configuration in order to provide for the authentication of the configuration before applying the configuration to the selected log in module.

Figure 1:
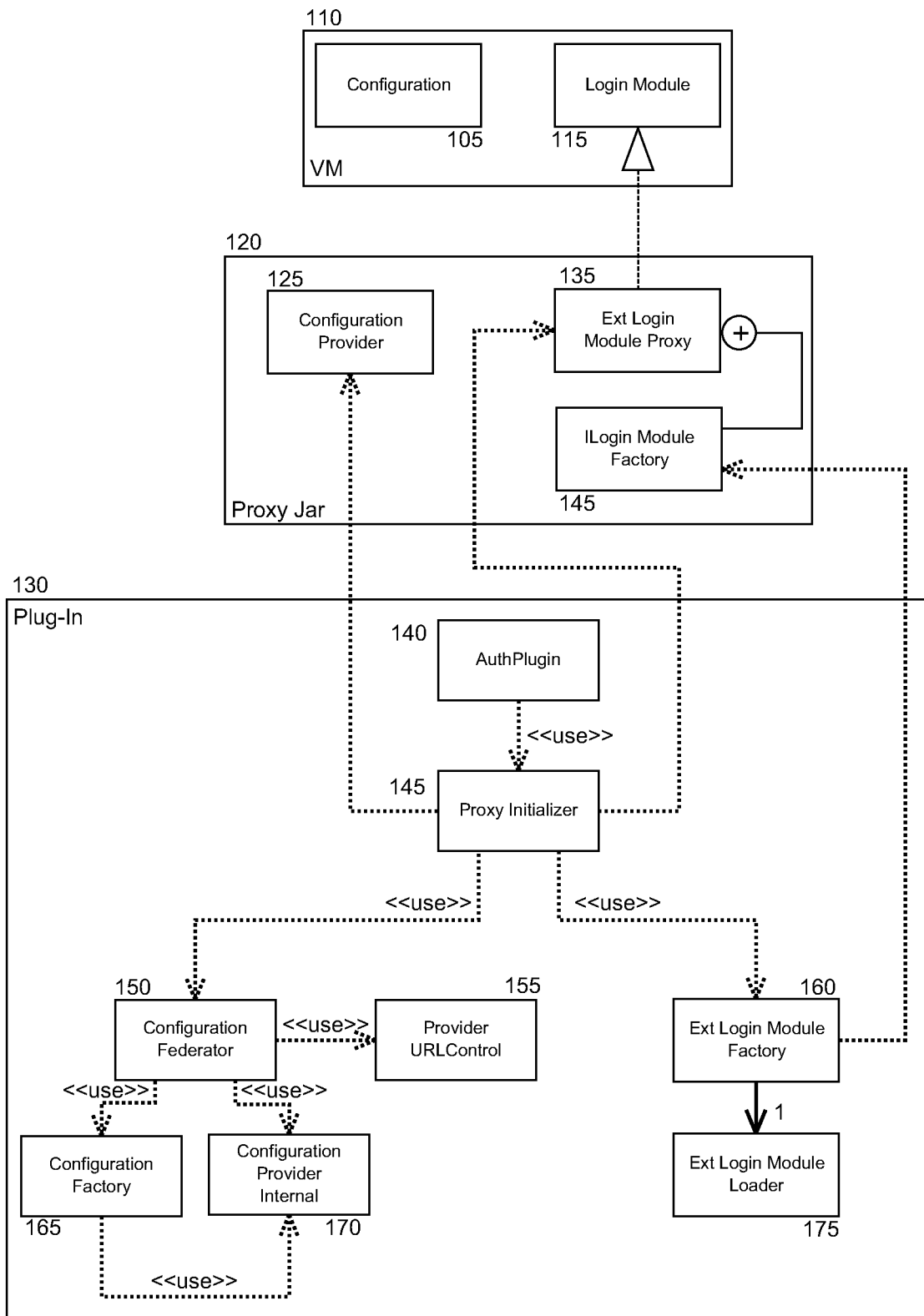
FIG. 1 is a block diagram of a programmatic architecture for log-in module deployment and configuration in an extension point oriented application.

In further illustration, FIG. 1 is a block diagram of a programmatic architecture for log-in module deployment and configuration in an extension point oriented application. The architecture can include a plug-in 130 to an extension point oriented application framework coupled to a proxy archive 120 further coupled to a virtual machine environment 110. The virtual machine environment 110 can provide both a log in configuration class 105 and a login module interface 115. The configuration class 105 can provide a method for retrieving a configuration instance for application to a login module instance implementing the login module interface 115.

The proxy archive 120 can include an external login module proxy class 135 implementing the login module interface 115. The external login module proxy class 135 further can be associated with an internal login module factory 145 configured to provide a reference to an instance of a target login module. The login module proxy class 135 in particular can provide methods for establishing a relationship with the internal login module factory 145, for creating a new proxy instance of the external login module proxy class 135, for initializing a new proxy instance of the external login module proxy class 135, for processing a login request into an application supported by the framework, for committing a login, aborting a login in and processing a logout from the application supported by the framework.

Notably, the plug-in 130 can include an authentication plug-in class 140 referencing an instance of a proxy initializer class 145. In particular, the plug-in 130 can access the framework through a logical coupling between an instance of the external login module proxy class 135 and a proxy initializer class 145 in the plug-in 130. To that end, an instance of the proxy initializer class 145 can be used by an instance of the authentication plug-in to initialize the communicative coupling between an instance of the external login module proxy class 135 and the instance of the authentication plug-in class 140. The instance of the authentication plug-in class 140 itself can be invoked as part of an early startup routine executing through an early startup extension point to the framework to allow the plug-in 130 to set its internal login module factory.

Specifically, an instance of the internal login module factory 145 can include program code enabled to retrieve a target login module by reference to a set of options—namely a module point option. The program code resident in the instance of the proxy initializer class 145 in turn can invoke an instance of the external login module factory 160 to locate and load an instance of the desired login module according to a specific extension identifier corresponding to a value for the module point option. An instance of an external login module loader class 175 in turn can provide program code to physically load the located instance of the desired login module and to provide a reference to the same into the instance of the internal login module factory class 145 in the proxy archive 120.

For example, in the context of the Eclipse framework, a single proxy which connects an application classloader to the classloader for the plug-in is appended to the bootclasspath by passing the virtual machine argument "–Xbootclasspath:a/<path-to-proxy-jar>". The proxy class can include an internal factory interface which exposes the method "LoginModule getTargetLoginModule(Map options)". The controller plug-in can use the earlyStartup extension point to the Eclipse framework to allow the controller plug-in to set the internal LoginModule factory as the provider of LoginModules for the system. The factory method can be called when the ExtLoginModuleProxy class is used in a login Configuration, and it can be passed the full set of options that were specified in the Configuration.

In order to locate the target LoginModule, the internal factory can view the value of the modulePoint option to locate an extender with that specific extension identifier. Subsequently, the createExecutableExtension function can be applied to ask the plug-in to instantiate and return the loginModule to the proxy. The proxy instance in turn can forward all of its requests to the LoginModule that was contained in the providing plug-in.

Referring again to FIG. 1, the instance of the proxy initializer class 145 also can be coupled to an instance of the configuration provider class 145 in the proxy archive 120 and the instance of the proxy initializer class 145 also can enjoy an association with an instance of a configuration federator class 150. The configuration federator class 150 can encapsulate one or more instances of the configuration 105 provided by an instance of a configuration factory 165 utilizing an instance of an internal configuration provider class 170. The instance of the configuration federator class 150 further can utilize an instance of a provider address control class 155 encapsulating methods to establish and retrieve an external address corresponding to a login configuration.

For example, in the context of the Eclipse framework, the proxy class contained in an archive installed to the bootclasspath can extend the core JAAS configuration provider and can proxy up to a single federator class in the controller plug-in. As such, applications can extend an extension point declared in the login controller plugin to provide one or more login configuration providers. The login controller can support the federation across all of the configuration providers installed in the plug-in system, provided that the configurations provided are unique across all installed configurations.

Thus, through the operation of the plug-in 130, a login module external to the extension point oriented application can be selected for coupling to the extension point oriented application via the proxy archive 120. Consequently, external services such as JAAS oriented authentication and authorization services can be provided for use with an extension point oriented application built upon an extension point oriented application framework like the Eclipse framework. Further, different login configurations for the login module can be provided externally to the extension point oriented application and federated as a single login configuration through the operation of an instance of the configuration federator class 150 of the plug-in 130. Finally, each login configuration in of itself can be represented in a markup language document so that portions or the entirety of the login configuration can be signed for further security.

Figure 2:
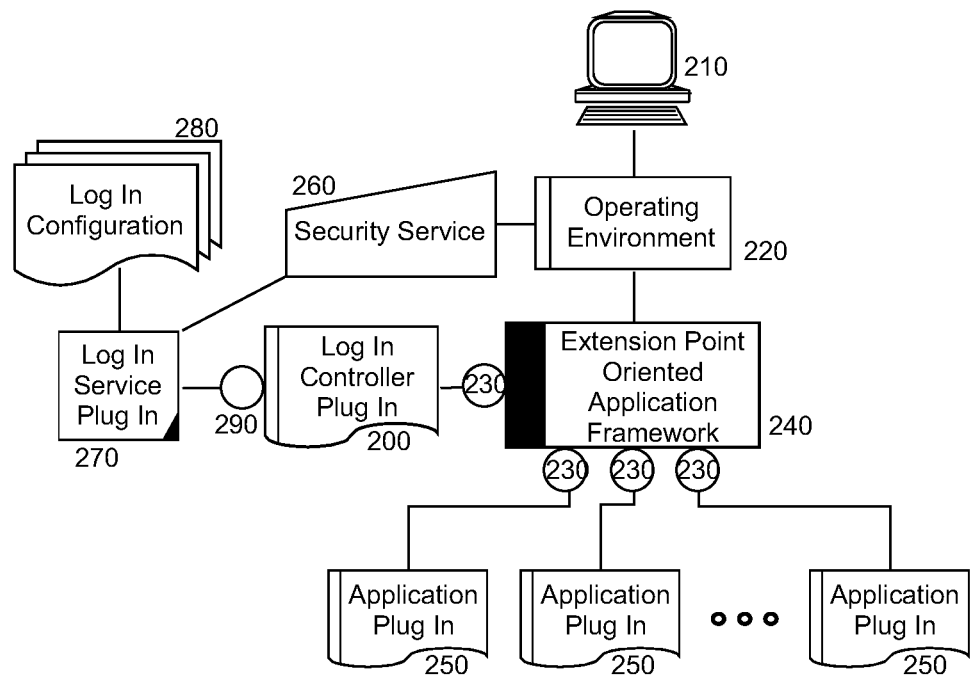
FIG. 2 is a schematic illustration of an extension point oriented application framework data processing system configured for log-in module deployment and configuration; and, FIG. 3 is a flow chart illustrating a process for log-in module deployment and configuration in an extension point oriented application.

In further illustration, FIG. 2 schematic depicts an extension point oriented application framework data processing system configured for log-in module deployment and configuration. The system can include a host computing platform 210 supporting an operating environment 220, for example an operating system or one or more virtual machines. The operating environment 220 can host the operation of an extension point oriented application framework 240 including one or more application plug-ins 250 coupled to the extension point oriented application framework 240 through respective extension points 230. The composition of the extension point oriented application framework 240 and plug-ins 250 can result in an extension point oriented application.

A log-in controller plug in 200 can be coupled to the extension point oriented application framework 240 through extension point 230. The log-in controller plug-in 200 can be configured to provide essential log-in functionality for the extension point oriented application defined by the extension point oriented application framework 240 and coupled application plug-ins 250. Yet further, the login controller plug-in 200 can provide an extension point 290 through which the login controller plug-in 200 can be extended to support an external security service 260 via login service plug-in 270. Finally, multiple different login configurations 250 can be specified for application to a login module extending the login controller plug-in 200. Each of the different login configurations 250 can be specified in markup so that different portions of the login configurations 250 can be readily identified and secured through signing.

Figure 3:
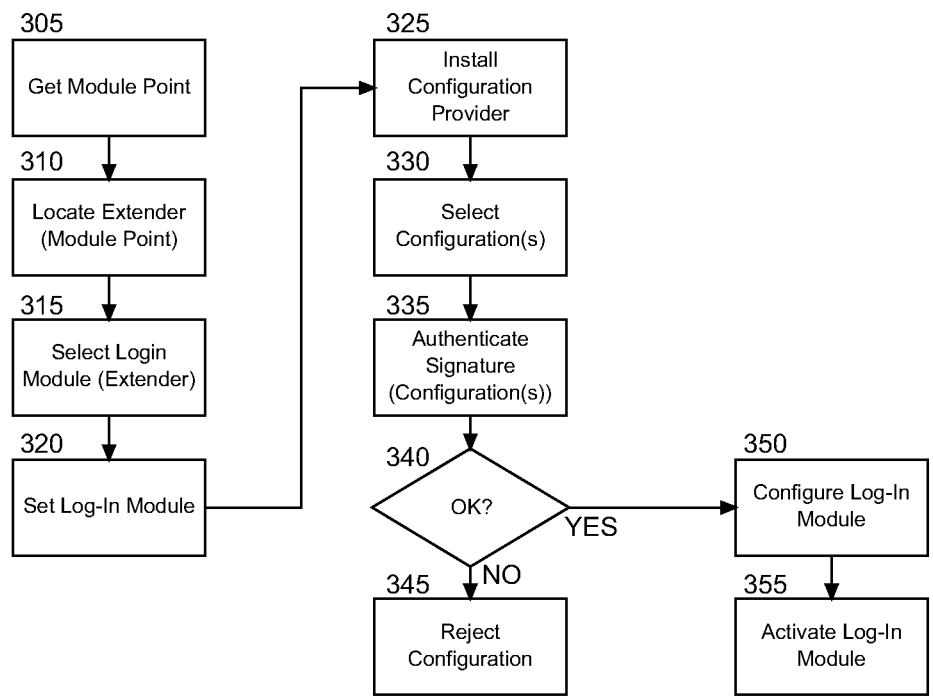

In even yet further illustration, FIG. 3 is a flow chart illustrating a process for log-in module deployment and configuration in an extension point oriented application. Beginning in block 305, a module point can be retrieved from a set of options provided to the proxy to the extension point oriented application in order to identify an extender with an extension identifier corresponding to the module point. In block 310 the extender can be located for the module point and in block 315 a corresponding login module can be selected for the identified extender. Thereafter, in block 320 the selected login module can be set as the login module for the extension point oriented application.

In block 325, a configuration provider can be installed for the extension point oriented application and in block 330, one or more login configurations can be selected for federation in application to the login module. In block 335, each of the login configurations can be authenticated by validating a signature applied to all or a portion of each of the login configurations. In decision block 340, if the login configurations cannot be authenticated, in block 345 the selected login configurations can be rejected. Otherwise, in block 350 the login module can be configured with a federation of the selected login configurations and in block 355 the login module can be activated for authenticating and authorizing access to the extension point oriented application.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for log-in module deployment and configuration in an extension point oriented application, the method comprising:
   installing a proxy to a login controller plug-in for the extension point oriented application executing in memory of a computer; and,
   proxying login module directives from an external security service to the login controller plug-in for the extension point oriented application;

wherein proxying login module directives from an external security service to the login controller plug-in for the extension point oriented application, comprises:

setting an internal login module factory as a provider of login modules to the extension point oriented application;

identifying an external login module proxy class in a configuration for the login module;

calling the external login module proxy class from the internal login module factory with an option specifying a particular login module by way of an extender associated with the option; and, instantiating the particular login module.

2. The method of claim 1, wherein installing a proxy to a login controller plug-in for the extension point oriented application, comprises installing the proxy in an archive to a boot classpath for the login controller plug-in.

3. The method of claim 1, further comprising:

proxying a federator class in the login controller plug-in; and, federating in the federator class a plurality of configurations for the particular login module.

4. The method of claim 3, further comprising authenticating signed portions of the configurations before federating the configurations for the particular login module.

5. A computer program product comprising a computer usable storage medium comprising a memory device storing computer usable program code thereon for log-in module deployment and configuration in an extension point oriented application, the computer program product comprising:

computer usable program code for installing a proxy to a login controller plug-in for the extension point oriented application; and, computer usable program code for proxying login module directives from an external security service to the login controller plug-in for the extension point oriented application;

wherein proxying login module directives from an external security service to the login controller plug-in for the extension point oriented application, comprises:

setting an internal login module factory as a provider of login modules to the extension point oriented application;

identifying an external login module proxy class in a configuration for the login module;

calling the external login module proxy class from the internal login module factory with an option specifying a particular login module by way of an extender associated with the option; and, instantiating the particular login module.

6. The computer program product of claim 5, wherein the computer usable program code for installing a proxy to a login controller plug-in for the extension point oriented application, comprises computer usable program code for installing the proxy in an archive to a boot classpath for the login controller plug-in.

7. The computer program product of claim 6, further comprising:

computer usable program code for proxying a federator class in the login controller plug-in; and, computer usable program code for federating in the federator class a plurality of configurations for the particular login module.

8. The computer program product of claim 7, further comprising computer usable program code for authenticating signed portions of the configurations before federating the configurations for the particular login module.

* * * * *